ABSTRACT

United States Patent [19]

Pokhodnya et al.

[11] 3,733,458

[45] May 15, 1973

[54] FLUX CORED ELECTRODE

[76] Inventors: Igor Konstantinovich Pokhodnya, Pereulok Mechnikova, 3, kv. 21; Vladimir Nikolaevich Golovko, Pechersky spusk, 18, kv. 77; Alexandr Mikhailovich Suptel, ulitsa Vladimirskaya, 95, kv. 29, all of Kiev, U.S.S.R.

[22] Filed: July 8, 1971

[21] Appl. No.: 160,920

[52] U.S. Cl..................................219/146, 219/137
[51] Int. Cl......................................B23k 35/22
[58] Field of Search.......................219/145, 146, 73, 219/137; 117/202–207; 148/24, 26

[56] References Cited

UNITED STATES PATENTS 3,221,136  11/1965  Freeth et al. ..................117/205 X
3,539,765  11/1970  Duttera .............................219/146

Primary Examiner—J. V. Truhe
Assistant Examiner—George A. Montanye
Attorney—Eric H. Waters et al.

[57] ABSTRACT

A continuous welding electrode for shielded-gas welding and building-up of steels consisting of 25 to 35 percent by weight of a powdery core in a steel envelope, the core consisting of the following components taken in per cent by weight:

| | |
|---|---|
| rutile concentrate | 20–40 |
| ferromanganese | 10–13 |
| feldspar | 0.6–6.0 |
| sodium fluosilicate | 0.6–4.6 |
| ferrosilicon | 0.6–2.0 | the balance being iron powder.

1 Claim, No Drawings

FLUX CORED ELECTRODE

The present invention relates to electrode materials for electric-arc welding and, more particularly, the invention relates to continuous electrodes for shielded-gas welding and building-up of metals.

This invention can be most effectively used in the process of automatic and semi-automatic welding at downhand, inclined, and horizontal position of the weld joints on a vertical plane.

Known in the art are continuous flux-cored electrodes for shielded-gas welding. These electrodes contain a powdery core. The electrodes having a core containing titanium dioxide and silica feature the best welding characteristics among the known electrodes for shielded-gas welding and building-up.

For example, a continuous flux-cored electrode is known the core of which contains 4–40 percent of deoxidizing ferroalloys, 75–96 percent of slag producing compounds, including 60–85 percent of titanium dioxide, 8–25 percent of silica, 4–20 percent of manganese oxides.

These known flux-cored electrodes, however, do not provide for high quality of the metal of the weld joint: when a metal covered with rust and scale is welded, the weld joint features a porous structure; the efficiency of the building-up is low.

The specific object of the invention is to develop such a continuous electrode for welding and building-up of metals in a shielding gas medium, the composition of the core of which would provide for good welding-and-technological characteristics and mechanical properties of the welded metal within a wide range of operating conditions, a high efficiency of the building-up process, and absence of pores in the weld joints on metal covered with rust and scale.

This object is attained by providing such a continuous electrode for shielded-gas welding and building-up of steels (preferably in an atmosphere of $CO_2$) which consists of a powdery core in a steel envelope comprising rutile concentrate and ferromanganese, wherein, according to the invention, the powdery core, besides the above components taken in the following percentages by weight:

| | | |
|---|---|---|
| rutile concentrate | 20 | 40 |
| ferromanganese | 10 | 13, | comprises:

| | | |
|---|---|---|
| feldspar | 0.6 | 6.0 |
| sodium fluosilicate | 0.6 | 4.6 |
| ferrosilicon | 0.6 | 2.0, | the balance being iron powder.

The continuous electrode having a core composition according to the invention has fine welding-and-technological characteristics and provides for a high quality of the weld joint metal during the welding. The weld joints made by means of such an electrode offer high resistance to formation of hot cracks and pores.

The present invention will be better understood from the following examples of carrying out the invention into effect.

The proposed continuous electrode for shielded-gas welding and building-up consists of a powdery core in a steel envelope comprising the following components (per cent by weight of the core):

| | |
|---|---|
| Rutile concentrates | 20–40 |
| Ferromanganese | 10.0–13.0 |
| Feldspar | 0.6–6.0 |
| Sodium fluosilicate | 0.6–4.6 |
| Ferrosilicon | 0.6–2.0 |

The balance being iron powder being the rest.

The selected ratio of the core components makes it possible to obtain slag having good physical characteristics.

The presence of sodium fluosilicate in the core sharply reduces the content of gases in the weld joint metal without deteriorating the technological characteristics of the electrode.

The sodium fluosilicate may be replaced by fluorite concentrate. However, in this case the content of fluorite concentrate in the electrode core must be equal to 4–6 percent. However, in this case the welding-and-technological characteristics of the electrode are drastically deteriorated and this is associated with poor formation of the weld joints, and intensive splashing of the electrode metal. To improve the transfer of the electrode metal, the electrode core should be provided with oxides of alkaline earth metals. But any increase in the oxidizing potential of the core is associated with deterioration of the mechanical properties of weld joint metal and formation of hot cracks in the weld joint.

The advantage of the proposed continuous welding electrode compared with the known electrodes is illustrated by the following examples wherein the weight of the core is in the range of 25 to 35 percent of the weight of the electrode.

Example 1

A continuous welding electrode having a diameter of 2 mm, in which the steel envelope comprises 75 percent of the total weight of the electrode, while the core contains the following components, percent by weight:

| | |
|---|---|
| Rutile concentrate | 20 |
| Ferromanganese | 10 |
| Feldspar | 0.6 |
| Sodium fluosilicate | 0.6 |
| Ferrosilicon | 0.6 |
| Iron powder | 68.2 | provides for good formation of fillet and butt joints. The electrode ensures high mechanical characteristics of the metal of the weld joint.

| Welding current, a. | Arc voltage, v. | Instantaneous strength, kg./mm.$^2$ | Specific elongation, percent | Impact strength, kgm./cm.$^2$ at temperature, °C. | |
|---|---|---|---|---|---|
| | | | | +20 | −60 |
| 320–350 | 26–28 | 50.2–50.4 | 26.4–29.0 | 15.8–17.5 | 8.3–9.1 |
| 400–450 | 30–32 | 50.2–53.6 | 27.4–30.2 | 15.9–18.0 | 9.3–10.2 |

Example 2

A continuous welding electrode of a diameter of 2.5 mm in which the steel envelope comprises 70 percent of the total weight of the electrode and the core contains the following components, percent by weight:

| | |
|---|---|
| Rutile concentrate | 28.8 |
| Ferromanganese | 11.6 |
| Feldspar | 3.3 |
| Sodium fluosilicate | 1.6 |
| Ferrosilicon | 1.0 |
| Iron powder | 54.0 | provides for extreme good formation of a weld joint when effecting the welding at downhand and inclined positions. The weld joints offer good resistance to cracks and pores. The mechanical properties of the weld joint metal and the weld joint are at a high level as is seen from the data given below.

| Welding current, a. | Arc voltage, v. | Instantaneous strength, kg./mm.$^2$ | Specific elongation, percent | Impact strength, kg./cm.$^2$ at temperature, °C. | |
|---|---|---|---|---|---|
| | | | | +20 | −60 |
| 320–350 | 27–29 | 50.5–51.6 | 29.0–30.2 | 17.0–19.5 | 1.5–10.8 |
| 400–450 | 30–34 | 52.0–53.5 | 27.5–28.5 | 17.2–18.5 | 7.3–8.8 |

Example 3

A continuous welding electrode having a diameter of 3.0 mm in which the steel envelope comprises 65 percent of the total weight of the electrode and the core contains the following components, percent by weight:

| Rutile concentrate | 40 |
| Ferromanganese | 13.0 |
| Feldspar | 6.0 |
| Sodium fluosilicate | 4.6 |
| Ferrosilicon | 2.0 |
| Iron powder | 34.4 | provides for fine formation of a weld joint metal when making fillet and butt joints.

The process is featured by a good stability. The electrode metal is not splashed around. Extremely high mechanical characteristics of the weld joint metal were obtained when welding butt joints.

| Welding current, a. | Arc voltage, v. | Instantaneous strength, kg./mm.$^2$ | Specific elongation, percent | Impact strength, kg./cm.$^2$ at temperature, °C. | |
|---|---|---|---|---|---|
| | | | | +20 | −60 |
| 350–400 | 28–30 | 50.6–51.6 | 27.0–29.0 | 15.9–18.2 | 8.3–9.1 |
| 450–500 | 33–36 | 53.6–55.2 | 26.4–28.3 | 15.5–18.0 | 7.5–8.1 |

The above examples clearly illustrate the advantages of the proposed continuous welding electrode.

The proposed electrode makes it possible to effect the welding by direct or alternating current, ensures extremely good formation of the weld joints, while providing for easy removal of the slag crust.

The efficiency of the building-up is up to 15 kg/hour. The splash of the electrode metal is completely eliminated. The welds made by means of the proposed electrode have extremely high mechanical characteristics and offer high resistance to formation of hot cracks. The electrode makes it possible to weld rusty and scaly metal.

We claim:

1. A continuous welding electrode for shielded-gas welding and building-up of steels said electrode consisting of 25 to 35 percent by weight of a powdery core and 75 to 65 percent by weight of a steel envelope, said core consisting of the following components in per cent by weight:

| rutile concentrate | 20 – 40 |
| ferromanganese | 10 – 13 |
| feldspar | 0.6 – 6.0 |
| sodium fluosilicate | 0.6 – 4.6 |
| ferrosilicon | 0.6 – 2.0 | the balance being iron powder.

* * * * *